United States Patent
Fuchs et al.

(10) Patent No.: US 6,824,193 B2
(45) Date of Patent: Nov. 30, 2004

(54) VEHICLE ROOF STORAGE COMPARTMENT COVER PARTICULARLY FOR PASSENGER CARS

(75) Inventors: Corinna Fuchs, Ludwigsburg (DE); Markus Papendorf, Besigheim (DE); Timo Czechtizki, Egersbach-Rosswälden (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/758,633

(22) Filed: Jan. 15, 2004

(65) Prior Publication Data

US 2004/0145210 A1 Jul. 29, 2004

Related U.S. Application Data

(63) Continuation-in-part of application No. PCT/EP03/04060, filed on Apr. 17, 2003.

(30) Foreign Application Priority Data

Jun. 7, 2002 (DE) .......................................... 102 25 630

(51) Int. Cl.[7] .................................................. B60J 7/20
(52) U.S. Cl. ............................ 296/107.08; 296/107.17; 296/136.06
(58) Field of Search ....................... 296/107.08, 107.17, 296/136.05, 136.06, 136.04

(56) References Cited

U.S. PATENT DOCUMENTS

| 6,672,645 | B2 | * | 1/2004 | Quindt | .................. 296/107.08 |
| 2001/0020793 | A1 | * | 9/2001 | Eberle | .................... 296/107.17 |
| 2002/0041109 | A1 | | 4/2002 | Wagner et al. | |

FOREIGN PATENT DOCUMENTS

| DE | 196 13 917 | 10/1997 |
| DE | 44 46 483 | 6/1998 |
| DE | 197 14 105 | 10/1998 |

* cited by examiner

*Primary Examiner*—Jason Morrow
(74) *Attorney, Agent, or Firm*—Klaus J. Bach (57) ABSTRACT

In a roof storage compartment cover of a vehicle, particularly for passenger cars, which have a roof that is movable between a closed position in which the roof covers an interior vehicle space and an open position in which the roof is deposited in a storage compartment behind the interior vehicle space, the storage compartment has a cover including a front cover part and a rear cover part which are supported by a support console and can be moved by a support mechanism out of the way to provide a passage for transferring the roof into and out of the storage compartment, the rear cover part being pivoted below the front cover part and being locked therein by pivoting the support console employing the roof operating mechanisms.

19 Claims, 5 Drawing Sheets

VEHICLE ROOF STORAGE COMPARTMENT COVER PARTICULARLY FOR PASSENGER CARS

This is a Continuation-In-Part Application of International application PCT/EP03/04060 filed Apr. 17, 2003 and claiming the priority of German application 102 25 630.6 filed Jun. 07, 2002.

BACKGROUND OF THE INVENTION

The invention relates to a vehicle roof storage compartment cover, particularly for passenger cars, which have a roof that is movable between a closed position, in which it covers on interior space of the vehicle, and a storage position, wherein the roof is deposited in a storage compartment which is disposed behind the interior space of the vehicle and which is provided with a storage compartment cover.

A storage compartment cover of this type is known from DE 196 13 917 in connection with a hardtop vehicle having a roof comprising front and rear roof parts, which can be deposited in a roof storage compartment with a storage compartment cover and a trunk with a trunk lid which is disposed behind the storage compartment cover and can be pivoted open about a rear transverse axis into a rearward upwardly inclined open position, in which access to the roof storage compartment is improved. For loading luggage into the trunk the trunk lid can be pivoted open in the opposite direction about a front pivot axis.

The roof storage compartment cover consists of two parts, that is, a front part and a rear part which, in their closed positions, jointly form a flat cover. The front part can be pivoted downwardly with respect to the rear part so that the rear part can be moved forwardly and a gap is formed in the transition area to the trunk lid through which the rear roof part extends when the vehicle roof is closed. In order to fully open the area covered by the storage compartment cover during the transfer of the roof between its closed and open positions, the forwardly moved rear cover part is pivoted upwardly while the downwardly pivoted front cover part remains in its lowered position.

Another multipart roof storage compartment cover is known from DE 44 46 483 A1. It consists of a center part forming a cover unit consisting of two cover elements and side parts disposed at opposite sides of the center part. The cover elements are formed by plates of which the—in vehicle direction—front plate, which is adjacent to the rear seats of the vehicle, forms a first cover element and the rear plate which is disposed adjacent the rear trunk lid of the vehicle forms a second cover element consisting of two sections. The two element sections are pivotally joined along a pivot axis extending in the transverse vehicle directing and can be moved folded together into a vertical position against the first cover element.

The cover elements are supported at opposite sides in slide tracks by which they are supported slidably in the longitudinal direction and the longitudinally extending slide tracks are themselves slidably supported on a guide track which is mounted to the vehicle body.

The relative mobility of the tracks is used to provide with the cover elements in the closed position of the roof a planar cover area behind the rear vehicle seat serving as a storage shelf. When the roof is in the open position deposited in the storage compartment, the gap between the trunk lid and the storage shelf is covered by the cover elements which, to this end, are moved into a position adjacent the trunk lid.

During the transfer of the roof from the closed position to the open position, in which the roof is deposited in the storage compartment, access to the storage compartment is provided in that the first cover element is pivoted forwardly and the two parts of the second cover element are folded together and pivoted into an upstanding position against the first cover element.

It is the object of the present invention to provide a storage compartment cover which facilitates adaptation of the cover to given conditions and which is advantageous with respect to space requirements and conversion efforts.

SUMMARY OF THE INVENTION

In a roof storage compartment cover of a vehicle, particularly for passenger cars, which have a roof that is movable between a closed position in which the roof covers an interior vehicle space and an open position in which the roof is deposited in a storage compartment behind the interior vehicle space, the storage compartment has a cover including a front cover part and a rear cover part which are supported by a support console and can be moved by a support mechanism out of the way to provide a passage for transferring the roof into and out of the storage compartment, the rear cover part being pivoted below the front cover part and being locked therein by pivoting the support console employing the roof operating mechanisms.

In addition with the concurrent movability of the front and rear cover parts by a movement of the support console the storage compartment cover can assume intermediate positions without occupying space within the storage compartment. The support console may be pivotable about a pivot axis which is stationary with respect to the vehicle body whereby a firm support can be provided for the cover parts and the operating linkage for the cover parts may also support and stabilize the cover parts. This is particularly true for the rear cover part which is supported pivotally about a support console-based axis, which extends transverse to the longitudinal vehicle direction. With the arrangement, both cover parts are adjustable with the adjustment of the support console.

By deriving the drive for the cover from the vehicle roof operating mechanism, a simple drive arrangement is obtained wherein as drive sources simple and reliable drive elements such as operating cylinders can be used.

Notwithstanding the common drive arrangement, the front and the rear cover parts which are supported by separate guide structures, can comply with different requirements in a simple manner, such that, for example by a connection of these guide structures to the rear roof part, particularly by using the C-columns as operating arms for the rear roof part, the operating mechanism as a whole can be simplified.

Another advantage of the use of the guide structures is that, by changing the length of the arms and/or by changing the lever relationships, the respective conditions can be taken into consideration in a simple manner, wherein hereby additionally certain desired transfer ratios can be realized with respect to the forces required or a faster or slower execution of certain adjustment movement.

It is also advantageous that the drive system according to the invention for the storage compartment cover can be utilized for locking the vehicle roof in its storage position in the storage compartment without additional expenditures.

Further particulars and features of the invention will become apparent from the following description of a preferred embodiment of the invention on the basis of the accompanying drawings.

DESCRIPTION OF A PREFERRED EMBODIMENTS

Figures 1, 5:
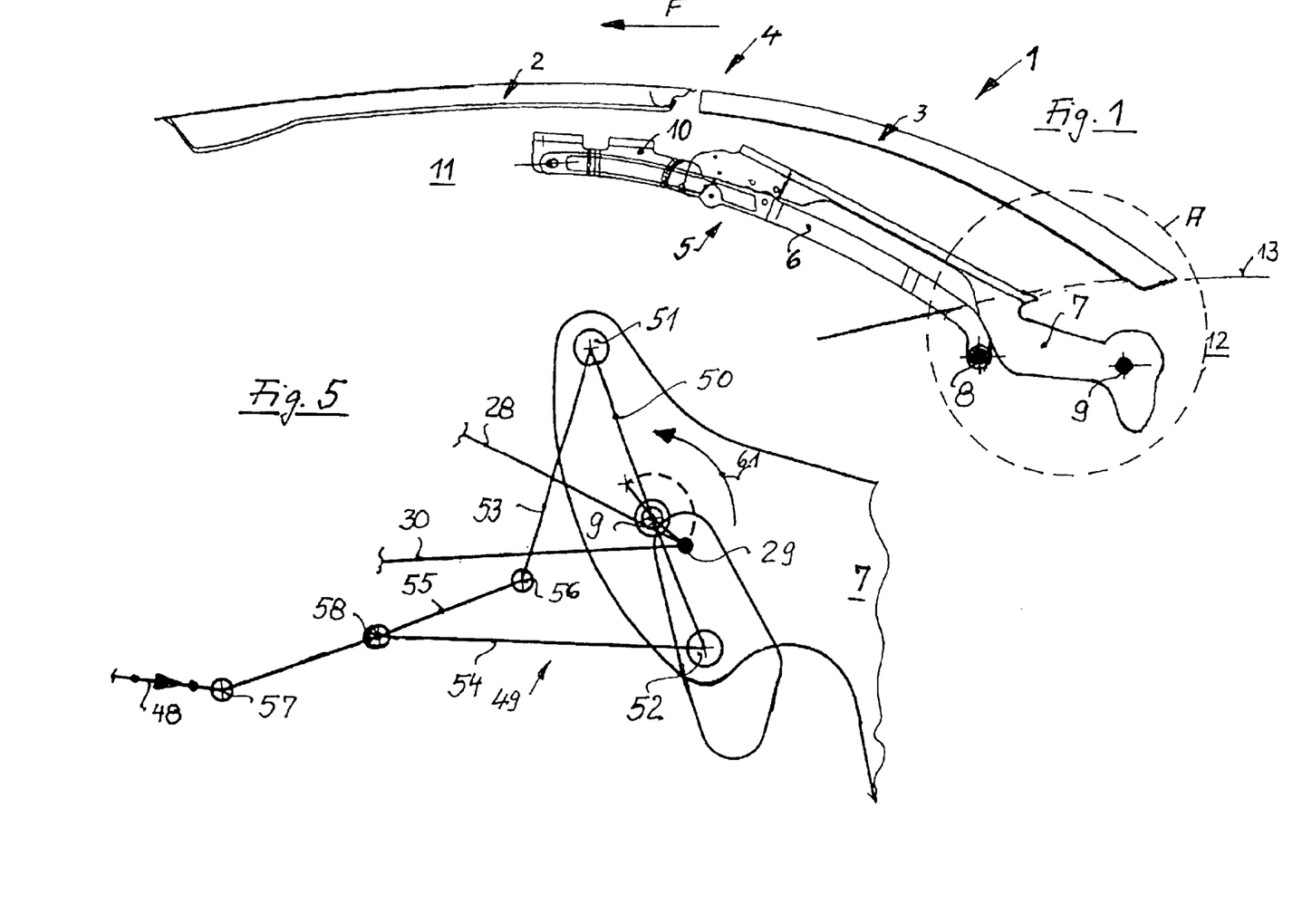
FIG. 1 shows in a schematic longitudinal cross-sectional view the roof of a convertible vehicle with a front and a rear roof part and a support linkage therefore, wherein the body of the vehicle is indicated only by a waist line, the support linkage for the vehicle roof being connected to the vehicle body below the waist line.
FIG. 5 is a schematic enlarged view of the section B encircled in FIG. 4.

FIG. 1 shows of a convertible vehicle 1 the roof 4 with a front roof part 2 and a rear roof part 3 and the operating mechanism 5 therefor, which comprises a main operating arm 6 and another operating arm, which is formed by, or integrally with, the C-column 7. Both operating arms are pivotally supported on the vehicle body on pivot axes 8 and 9 and are interconnected by way of a coupling 10. The coupling 10 is associated with the front roof part 2 and the rear window of the rear roof part is firmly or releasably connected to the C-columns 7.

Figure 4:
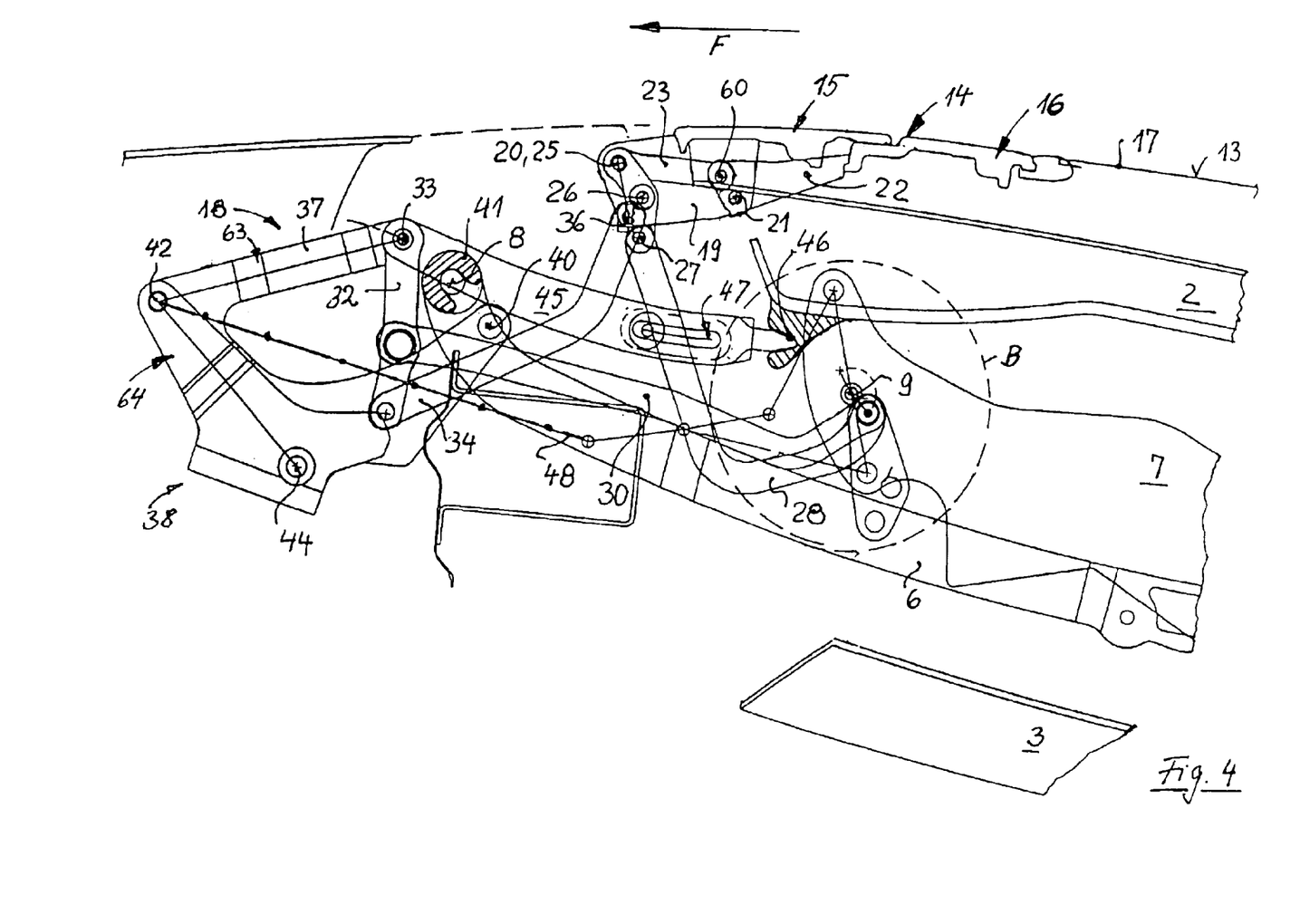
FIG. 4 is a representation according to FIGS. 2 and 3, wherein the storage compartment opening is closed by the storage compartment cover and the vehicle interior is open so that the vehicle is in a cabrio-configuration.

In the closed position shown in FIG. 1, the roof 4 covers the vehicle interior 11. As indicated in FIG. 4, the roof can be transferred into an open position, in which the roof 4 is deposited in a rear storage compartment 12, which may be separated from, or open toward, the vehicle trunk. With respect to the operating mechanism 5 shown a storage position for the roof 4 in the storage compartment is obtained in which the rear roof part 3, as indicated in FIG. 4, is deposited with the inside thereof facing upwardly and covered by the front roof part 2 whose inside faces downwardly toward the rear roof part 3. In the open position, in which the roof 4 is deposited in the storage compartment 12, the roof 4 is disposed below the vehicle waistline 13, which is only schematically indicated. The storage compartment 12 has at the level of the waistline 13 a top opening through which the roof 4 can be moved into, and out of, the storage compartment 12 and which is provided with a cover 14 as shown particularly in FIG. 4.

The cover 14 comprises a front cover part 15 and a rear cover part 16, wherein the rear cover part 16 is disposed in the area of the gap which accommodates the rear roof part 3, when it extends through the waistline 13 when the roof 4 is closed. Adjacent the rear roof part 3, there is a vehicle body part 17 which may be a fixed part of the vehicle body or a lid, specifically the trunk lid which, depending on the total arrangement, may be pivoted open upwardly toward the front for loading the trunk or, selectively, upwardly toward the rear for transferring the vehicle roof 4 between its open and closed positions.

Figure 2:
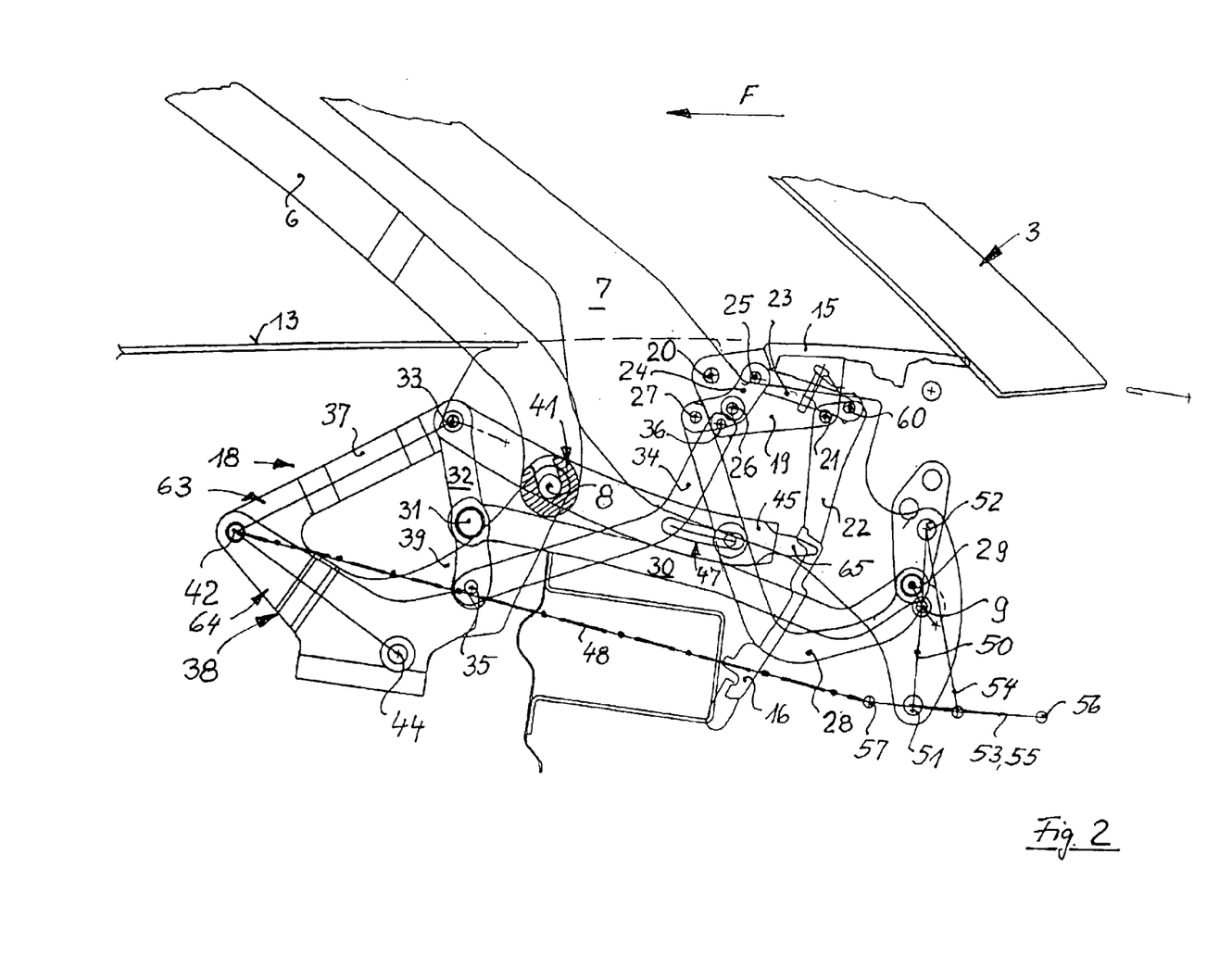
FIG. 2 is an enlarged representation of the details of the operating mechanism in the circle A of FIG. 1, a cover for the vehicle roof storage compartment being indicated disposed in the area of the vehicle body waist line.
Figure 3:
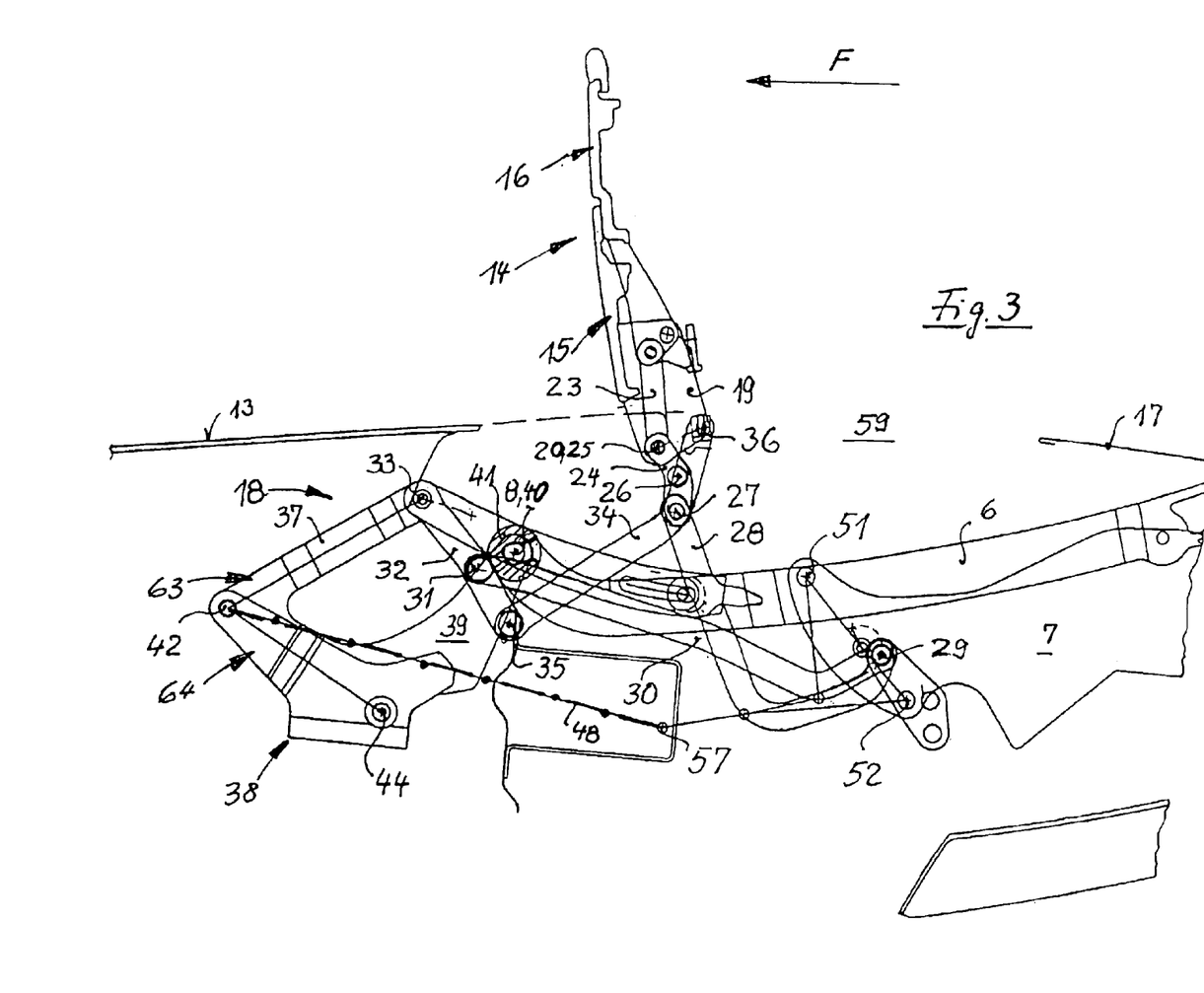
FIG. 3 shows schematically the roof storage compartment cover in an intermediate position in which the storage compartment is open for a transfer of the vehicle roof to the storage position in which the vehicle roof is disposed in the storage compartment below the waist line of the vehicle body.

FIGS. 2 to 4 show parts of the roof operating mechanism 5 and the support and device linkages, designated below drive linkage 18, for the cover 14 of the storage compartment wherein a common operating device is provided for moving the roof 4 and the storage compartment cover 14. This operating device may be a linear drive, and particularly a hydraulic cylinder as will be described below in greater detail. The operating device is connected to the C-column 7 for pivoting the C-column 7 during the transfer of the roof 4 between the open and closed positions, the drive movements for the drive linkage (18) of the roof storage compartment cover 14 are derived from the movement of the C-column 7.

As part of the drive linkage 18, the storage compartment cover 14 is provided with a support console 19, which is pivotable about a vehicle body based pivot axis 20, which extends near the support console 19 next to the waistline 13. Firmly connected to the support console 19 is the front cover part 15, to which the rear cover part 16 of the storage compartment cover 14 is pivotally connected. FIG. 4 shows the flat cover positions of the front and rear cover parts 15 and 16 with the roof 4 deposited in the storage compartment 12. FIG. 2 shows the front cover part 15 in the cover position in accordance with FIG. 4 essentially in the plane of the vehicle waistline 13 and the rear cover part 16 pivoted downwardly below the front cover part 15 whereby the gap for accommodating the rear roof part 3 in the closed position of the vehicle roof 4 is established.

The rear cover part 16 includes an extension 22 which is supported on the support console 19 at a pivot axis 21, which is stationary with respect to the support console 19. A support lever 23 is linked to the extension 22 of the rear cover part 16 by way of a pivot-joint 60, which is spaced from the pivot axis 21. The support lever 23 extends essentially in the direction of the closed cover parts 15 and 16 and is linked to one end of a double arm lever 24 by way of a pivot joint 25. The double arm lever 24 is supported at the longitudinal center area thereof by a vehicle body-based pivot joint 26 and, at its end opposite the support lever 23 is connected by way of a joint 27 to a drive arm 28. The drive arm 28 is linked to the C-column 7, eccentrically to the pivot axis 9 of the C-column, by way of the pivot joint 29, which forms one arm of the roof operating mechanism 5. As a result of this interconnection between the C-column 7 and the rear cover part 16, the rear cover part 16 is pivoted along with the pivot movement of the C-column 7.

On this drive connection of the C-column 7 to the storage compartment cover 14 another drive connection is superimposed, which comprises a drive arm 30, which is connected by means of a joint 31 to an intermediate arm 32, which, with one end thereof, is supported on the vehicle body by way of a pivot joint 33. Further, a support arm 34 is connected to the intermediate arm 32 by a pivot joint 35. At the opposite end, the support arm 34 is connected to the support console 19 by a joint 36 such that the joint 36 is arranged eccentrically with respect to the stationary axis or joint 20 of the support console 19.

When the covet parts 15, 16 are aligned that is when they are disposed in a common plane, the pivot joint 20 of the bearing console 19 and the pivot joint 25 between the double arm lever 24 and the support lever 23 are disposed co-axially (see FIGS. 3 and 4) or almost co-axially. Then with the shown vehicle body-stationary arrangement of the pivot joint 20 of the support console 19 and via the pivot joint 26 of the double arm lever 24, the support console 19 can be pivoted by the support arm 34 together with the two cover parts 15 and 16 while the cover parts 15 and 16 do not change their relative positions. A slight displacement from the co-axial positions of the pivot joints 20 and 25 results in only slight position changes as long as the position of the double-arm lever 24 relative to the support console 19. On the other hand, by a corresponding timing of the jointed connections a displacement relative to each other can be achieved. The movement can also be influenced by the position of the pivot joints 31 and 35 between the intermediate arm 32 and the support arm 34, since by way of the distances between the joints 31 and 35 and the distance thereof from the vehicle body connection of the intermediate lever 32 via the pivot joint 33, the respective transmission ratios of the movements can be changed.

When reference is made in the example to axes or pivot axes also the pivot joints are meant which comprise for example pivot bearings.

In the embodiment described, the drive arms 28 and 30 are pivotally connected to the C-column 7 along a common axis which extends eccentrically to the pivot axis 9 of the C-column by means of the pivot joint 29. This is an advantageous arrangement but is not essential.

A corresponding arrangement can be provided for the vehicle-body connection of the intermediate arm 32 by the pivot joint 33 which must be stationary with respect to the vehicle body. There are other possibilities of influencing the movements of the parts outside the solution shown in the embodiment described, wherein the intermediate arm 32 is pivotally connected by way of the joint 33 to the one leg 37 of a lever arm 63 of a double arm lever 38. The other leg 39 of the lever arm 63 carries a catch pin 40 to be received in a catcher opening 41 arranged concentrically with the pivot axis of the main operating arm 6. The two legs 37 and 39 of the lever arm 63 are spread in the transverse direction of the vehicle and the rocker 38 with a basically U-shaped cross-section includes a second lever arm 64. The rocker 38 is pivotally supported on the vehicle body by a pivot joint 44, which is mounted on a support console 43, which is preferably firmly supported by the vehicle body as shown. If the support console 43 is locked to the vehicle body, the rocker 38 is also stationary with regard to the vehicle body as long as the catcher opening 41 is held by the catch pin 40. This position is shown in FIGS. 2 and 3 wherein the vehicle roof 4 is in a closed position (FIG. 2) or is in a transition position to the storage position in the storage compartment 12 (FIG. 3). In this transition position of the vehicle roof, the cover 14 is pivoted forward and upwardly as shown in FIG. 3 to provide access to the storage compartment 12.

When the catcher 41 releases the catch pin 40, the rocker 38 can pivot about the pivot joint 44 and, in accordance with the invention, this pivot movement is used to move a locking member 45 into a locking opening 46 in the roof 4, particularly in the front roof part 2 (FIG. 4) so that the roof 4 is locked in its position in the storage compartment 12. The locking member 45 is connected to the rocker 38 by way of the pivot joint 33 on the leg 37 of the rocker 38 at the connection to the intermediate arm 32 and, at its opposite end, is provided with an engagement finger 15. Expediently, the locking member 45 is guided into the locking opening 46 by a slide guide structure 47, which is shown for illustration as a slot with a stationary guide bolt extending therethrough.

As pointed out earlier, there is a common drive for the roof 4 and for the cover 14 and in accordance with the invention this drive is also used for locking the roof 4 in its storage position in the storage compartment.

FIGS. 2 to 4 show the drive arrangement herefor. A linear operator in the form of an operating cylinder, particularly a hydraulic cylinder 48, is indicated by a dash-dotted line. The operating cylinder 48 is connected with its operating end to the rocker 38 eccentrically to the pivot support joint 44 of the rocker 38 by way of a pivot joint 42 arranged at the juncture of the arms 63 and 64. At its opposite end, the operating cylinder 48 is supported particularly with its piston rod on a drive linkage 49 as it is shown enlarged in FIG. 5. The drive linkage 49 includes a base structure 50, which is connected to connecting links 53 and 54 by pivot joints 51 and 52, which are disposed opposite each other, preferably diametrically opposite each other with respect to the pivot axis 9 of the C-column 7. Another link 55 is connected with one end to the connecting link 53 by way of a joint 56 and at its opposite end to the operating cylinder 48 by way of a joint 57 and to the connecting link 54 by way of a joint 58 disposed between the joints 56 and 57 of the connecting link 55.

In accordance with the forces required for the movement of the vehicle roof 4, the operating cylinder 48 extends, starting with the situation as shown in FIG. 4, wherein the roof is deposited in the storage compartment 12, essentially in the same direction as the connecting link 54, which, in this start-out position the connecting link is disposed at a large, that is angle of essentially 70°, to the base structure 50. In this way, for lifting the roof 4 out of the storage compartment 12 first a large moment is applied to the base structure 50 with respect to the pivot axis 9, while, because of the orientation of the cylinder 48 with a small inclination of the link 55 with respect to the connecting link 54, only a small opposite support moment is generated in the connecting links. During lifting of the roof 4 out of the storage compartment 12 (FIG. 3) the base structure moment becomes smaller, since, upon pivoting the roof 4 in closing direction in accordance with the arrow 61, the inclination of the operating cylinder 48 with respect to the base structure becomes smaller until, with the roof closed (FIG. 2) and the base structure 50 pivoted by more than 180°, the operating cylinder 48 extends again about at an angle of 90° with respect to the base structure 50 so that a large moment is again available for the opening of the roof 4. A corresponding tuning of the moments can be achieved also by way of the selection of the arm lengths of the base structure 50 at opposite sides of the pivot axis 9. Expediently, the base structure 50 has a length which is about the same as the length of the connecting link 54 which is connected to the connecting link 55 at the pivot joint 58. The pivot joint 58 is arranged preferably in the center of the connecting link 55. The length of the connecting link 55 is also about the same as that of the base structure 50 and the connecting link 54. The length of the connecting link 53 is about two thirds of the length of the base structure 50. In the start-out position as shown in FIG. 2 (with the roof closed), the connecting link 55 extends to the connecting link 54 preferably under an angle of about 20 to 40°, particularly about 30°; the angle between the base structure 50 and the connecting link 53, which opens toward the connecting link 54 is 30° to 50°, preferably about 40°.

It can be seen from FIG. 5 that the distance between the pivot axis 9 of the C-column and the connection of the drive arms 28 and 30 by way of the pivot joint 29 on the C-column 7 is relatively small so that the drive arms 28, 30 are displaced during the movement of roof 4 between the closed and open positions by relatively small amounts and relatively little space is needed herefor.

In addition to the movement of the vehicle roof 4 and the cover 14, the arrangement according to the invention provides also for the uncoupling of the operating cylinder 48 from the C-column 7 when the roof has reached its storage position in the storage compartment 12 by the release of the catch pin 40 from the catcher opening 41. Then further movement of the operating cylinder 48 is converted to a pivot movement of the support console 43 and the rocker 38 since the intermediate arm 32 is engaged against the compartment cover 14 and the C-column 7. The pivot movement of the rocker 38 is converted to a forward movement of the locking member 45, whereby the roof 4 is locked in the storage compartment 12.

Figure 6:
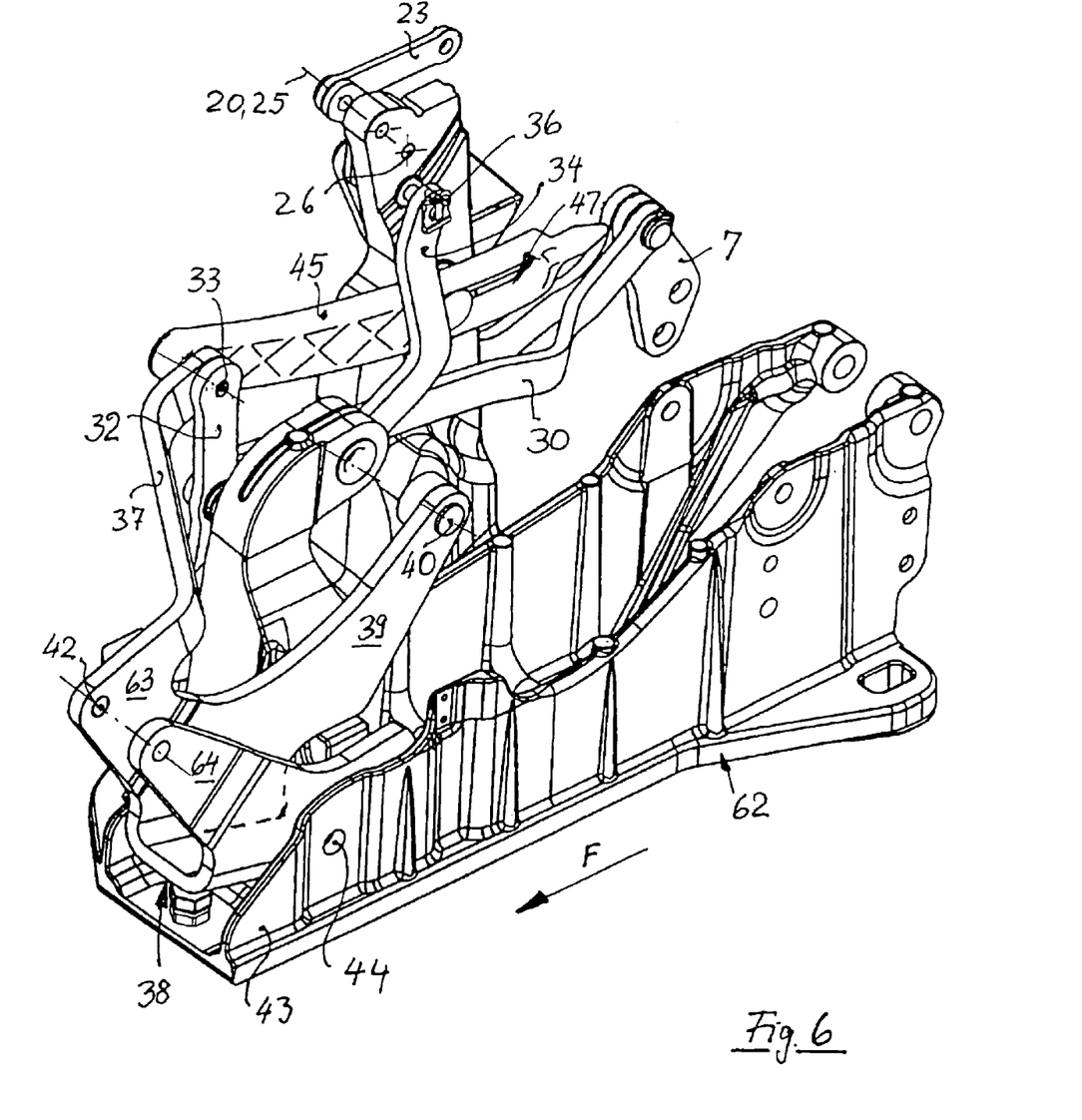
FIG. 6 is perspective schematic partial representation of the drive linkage for the storage compartment cover in the cabrio configuration of the vehicle.

FIG. 6 shows in a reduced perspective view a possible design for a vehicle body support unit 62, which could also form the support console 43 and which would also include the supports for the main operating arm 6 and the C-column 7. To facilitate the understanding the visible components are indicated by the reference numerals used in the description for designating corresponding parts and the support console 19 is not shown.

What is claimed is:

1. A roof storage compartment cover for vehicles, particularly for passenger cars, with a vehicle roof (4) movable between a closed position, in which the roof (4) covers an interior vehicle space (11), and an open position, in which the roof (4) is deposited in a storage compartment (12) behind the interior vehicle space (11), said storage compartment (12) being provided with a cover (14) comprising a front cover part (15) and a rear cover part (16) disposed adjacent a vehicle body structure (17) providing an opening for accessing the storage compartment (12) when the rear cover part (16) is pivoted upwardly and forwardly in an intermediate position of the vehicle roof (4) and which, in the closed position of the vehicle roof (4) is moved to a position spaced from the adjacent vehicle body structure (17) to provide therebetween a passage for the roof (4), said cover parts (15, 16) being supported by a support console (19) so as to be pivotable relative to each other and movable relative to the vehicle body, said support console (19) being pivotally supported and said cover parts (15, 16) being disposed adjacent one another in a plane in an open and a closed position of the storage compartment and being movable between the open and closed positions by pivoting of the support console (19) and with the support console (19) being in a position corresponding to the closed position of the cover (14), the rear cover part (16) being pivoted toward the support console (19) below the front cover part (15).

2. A roof storage compartment cover according to claim 1, wherein said support console (19) is supported pivotably about a pivot axis (20), which is stationary relative to the vehicle body and extends transverse to the longitudinal vehicle direction.

3. A roof storage compartment cover according to claim 1, wherein said rear cover part is pivotably supported by a pivot joint on said support console (19).

4. A roof storage compartment cover according to claim 1, wherein said vehicle roof (4) is supported by an operating mechanism (5) which is linked to said cover (14) so as to actuate also said cover (14).

5. A roof storage compartment cover according to claim 4, wherein said roof (4) comprises a rear roof part (3), which is supported on the vehicle body so as to be pivotable about a transverse pivot axis (9) and operatively connected to the operating mechanism (5) for said cover (14).

6. A roof storage compartment cover according to claim 5, wherein said rear roof part (3) comprises a C-column (7) of the vehicle and said operating mechanism (5) for said cover (14) interacts with the pivot movement of said C-column (7) during the movement of the vehicle roof (4) between the open and closed positions.

7. A roof storage compartment cover according to claim 1, wherein a drive linkage for the cover (14) is provided which includes different operating mechanisms (23, 24, 28 and 30, 32, 34) for driving the support console (19) and for driving the rear cover part (16).

8. A roof storage compartment cover according to claim 7, wherein the operating mechanisms (23, 24, 28, and 30, 32, 34) for the rear roof (3) part have at least approximately coinciding pivot connection axes (29) and are disposed adjacent to a vehicle body based pivot axis (9) of the rear roof part (3).

9. A roof storage compartment cover according to claim 6, wherein the operating mechanism (23, 24, 28) for the rear covet part (16) comprises a drive arm (28) which is pivotally connected to the C-column (7) and engages, by way of a double arm lever (24), which is pivotally supported on the support console (19), the rear cover part (16) wherein the double arm lever (24) is linked opposite the support console (19) by way of a support lever (23) eccentrically with respect to the pivot axis (21) of the rear cover part (16).

10. A roof storage compartment cover according to claim 7, wherein said operating mechanism (30, 32, 34) connected to said console (19) comprises a drive arm (30) which is pivotally connected to a C-column (7), and which is connected by way of an intermediate arm (32) to a support arm (34) that is pivotally connected to the support console (19), and the intermediate arm (32) is pivotally connected to a vehicle body joint (33) and forms a position dependent support for the drive arm (3) and the support arm (34) connected thereto.

11. A roof storage compartment cover according to claim 10, wherein the intermediate arm (32) is supported with respect to the vehicle body at one end by a pivot joint (33) on a rocker (38) which is stationary during movement of the roof (4).

12. A roof storage compartment cover according to claim 11, wherein said rocker (38) is pivotally supported on a vehicle body-based support console (43) and has two arms (63, 64) extending from the pivotal support area.

13. A roof storage compartment cover according to claim 12, wherein one of said arms 63 of said rocker (62) comprises two legs (37, 39) one of said legs (37) of said rocker (38) being connected to the intermediate arm (32) and the other leg (39) of the rocker (38) carrying a catch pin (40) which, dependent on its position, is engaged by a catcher opening (41) so as to be fixed in position.

14. A roof storage compartment cover according to claim 13, wherein the catcher with the opening (41) is connected to the main operating arm (6) of the front part (2) of the roof (4) which is supported by a vehicle body-based pivot bearing and the axis of the catcher opening (41) coincides with the vehicle body-based stationary pivot axis of the main operating arm (6).

15. A roof storage compartment cover according to claim 13, wherein said catcher opening (41) releases the catch pin (40) when the roof (4) is open and deposited in the roof storage compartment (12), a locking member (45) is connected to said rocker (38) and extends into a locking opening (46) of the roof (4) deposited in the storage compartment (12) when the catch pin (40) is released from the catcher opening (41).

16. A roof storage compartment cover according to claim 15, wherein said locking member (45) is guided with respect to the vehicle body by a slide guide structure (47).

17. A roof storage compartment cover according to claim 11, wherein said storage compartment cover (14) is connected to the C-column (7) and a linear drive (46) is connected opposite the C-column (7) to the rocker (38) by way of a pivot joint (42).

18. A roof storage compartment cover according to claim 17, wherein said pivot joint (44) of the rocker (38) on the support console (43) is spaced from the pivot joint (42) by which the linear drive (46) is connected to the rocker (38).

19. A roof storage compartment cover according to claim 17, wherein the linear drive is formed by an operating cylinder (46), which is connected by a drive linkage (49) forming a switchover drive coaxially with the pivot joint (9) of the C-column (7).

* * * * *